(12) United States Patent
Chongoushian et al.

(10) Patent No.: US 9,936,499 B2
(45) Date of Patent: Apr. 3, 2018

(54) FAST TERMINAL ENTRY IN LINK 16 TACTICAL NETWORKS

(71) Applicant: BAE Systems Information and Electronics Systems Integration Inc., Nashua, NH (US)

(72) Inventors: John H. Chongoushian, Emerson, NJ (US); Wayne W. Altrichter, Chatham, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 102 days.

(21) Appl. No.: 15/032,163

(22) PCT Filed: Aug. 10, 2015

(86) PCT No.: PCT/US2015/044497
§ 371 (c)(1),
(2) Date: Apr. 26, 2016

(87) PCT Pub. No.: WO2016/028536
PCT Pub. Date: Feb. 25, 2016

(65) Prior Publication Data
US 2016/0262151 A1 Sep. 8, 2016

Related U.S. Application Data

(60) Provisional application No. 62/040,450, filed on Aug. 22, 2014.

(51) Int. Cl.
*H04W 4/00* (2018.01)
*H04W 72/04* (2009.01)
*H04Q 11/04* (2006.01)
*H04H 20/16* (2008.01)
(Continued)

(52) U.S. Cl.
CPC ........ *H04W 72/0446* (2013.01); *H04H 20/16* (2013.01); *H04L 27/10* (2013.01); *H04Q 11/04* (2013.01); *H04L 2012/6459* (2013.01)

(58) Field of Classification Search
None
See application file for complete search history.

(56) References Cited

U.S. PATENT DOCUMENTS

| 6,347,084 B1 | 2/2002 | Hulyalkar et al. |
| 6,510,150 B1 | 1/2003 | Ngo |
| 2007/0274346 A1 | 11/2007 | Lord |

(Continued)

FOREIGN PATENT DOCUMENTS

WO PCT/US2015/044497 8/2015

*Primary Examiner* — Farah Faroul
(74) *Attorney, Agent, or Firm* — Scott J. Asmus

(57) ABSTRACT

A process for allowing a Concurrent Multi-Netting (CMN-4) equipped Link 16 terminal to enter an active network. After an initial entry command is entered at the terminal at a given current time at the terminal, a number of time slots are identified in which multiple receivers at the terminal have an opportunity to detect an initial entry message (IEM) after the given current time. Each of the receivers is set to detect an IEM during a different one of the identified time slots. When an IEM is first detected by one of the receivers, the current time at the terminal is reset based on the time slot in which the IEM was detected.

5 Claims, 12 Drawing Sheets

(51) Int. Cl.
*H04L 27/10* (2006.01)
*H04L 12/64* (2006.01)

(56) References Cited

U.S. PATENT DOCUMENTS

| | | | |
|---|---|---|---|
| 2008/0147505 A1* | 6/2008 | Davis | G06Q 30/02 |
| | | | 705/14.64 |
| 2008/0316966 A1 | 12/2008 | Joshi et al. | |
| 2009/0103474 A1* | 4/2009 | Lu | H04W 16/14 |
| | | | 370/328 |
| 2009/0303895 A1* | 12/2009 | Zhang | H04B 7/2606 |
| | | | 370/252 |
| 2013/0265933 A1 | 10/2013 | Powell, III et al. | |
| 2017/0099585 A1* | 4/2017 | Wasserman | H04W 4/06 |

* cited by examiner

—Prior Art—

--Prior Art--

--Prior Art--

# FAST TERMINAL ENTRY IN LINK 16 TACTICAL NETWORKS

CLAIM OF PRIORITY

This application claims priority of U.S. Provisional Patent Application No. 62/040,450 filed Aug. 22, 2014, titled "Improved Link-16," the entire contents of which are incorporated by reference.

BACKGROUND OF THE INVENTION

Field of the Invention

The present invention relates to wireless communication networks, particularly Link 16 tactical information networks.

Discussion of the Known Art

Overview

Link 16 is a secure, jam-resistant, tactical digital information network that uses a time division multiple access (TDMA) network signaling protocol. See, C. Kopp, "Network Centric Warfare Fundamentals," Part 3, Defence Today Magazine, NCW 101 Networked Operations (2005), pages 12-19; and Northrop Grumman, Understanding Voice and Data Link Networking, pages 2-1 to 2-76 (December 2013), both of which publications are incorporated by reference. Link 16 also uses frequency division multiple access (FDMA) and code division multiple access (CDMA) waveforms so that members of the network can exchange situational awareness data securely in a tactical environment. Most transmissions by users of Link 16 terminals comprise broadcast message data, i.e., message data intended for reception and use by all network members. The data is transmitted in the form of pulses that are modulated by minimum shift keying (MSK) on a radio frequency (RF) carrier signal, usually in a RF band allocated for radio navigation. The data format is known as tactical digital information link-J series, or TADIL-J, as defined in MIL-STD-6016. Specifically, the format is (Jx.y), where x is a defined label of the message (a value from 0 to 31), and y is a message sub-label (a value from 0 to 7).

The FDMA and CDMA features of Link 16 support the formation of so-called stacked nets, whereby multiple independent sub-networks or "nets" numbered from 0 to 126 are defined as shown in FIG. 1. Members of any given net can exchange message data using assigned frequencies and coding determined to cause little if any interference to other message data exchanged simultaneously among members of the other nets.

In order for an outside Link 16 terminal to enter an active Link 16 network, and to adjust or reset a current time reference at the terminal to conform to the time reference used by the network, the terminal must first detect an initial entry message (IEM) that is transmitted periodically by one or more current members of the network. The TADIL-J format of the IEM is J0.0.

Once detected at the terminal, the IEM enables the terminal to determine the network time and to reset the terminal's current time accordingly. The IEM includes certain network operating information including a current default net number, typically zero (0). After entering the network, the terminal follows specified procedures to obtain coarse and fine time synchronization so that the terminal can exchange messages and otherwise participate in the network.

FIG. 2 shows a receiver system 10 in a conventional Link 16 terminal. The system 10 includes a low noise amplifier (LNA) 12 at a front end of the system. An input of the LNA 12 is coupled to antenna 14, and the output of the LNA is provided to a hard limited MSK receiver 18. Link 16 terminals may use two separate receivers 18 for each antenna 14 with a common LNA 12. The receiver 18 is configured to dwell on a determined frequency until the receiver detects a message preamble. Once a preamble is detected during a certain time slot, message data received during the time slot is detected and combined with the preamble by a signal processor 20. The processor 20 performs error correction and other functions on the data, and supplies the processed data to a cryptographic subsystem 22 an output of which is sent to a Link 16 application processor 24. The application processor 24 sends the decrypted message to a host computer, and/or processes the message data further depending on the message type. This process repeats for each time slot.

Link 16 Timing

Network time in Link 16 is comprised of successive time intervals called epochs, each epoch being 12.8 minutes long. Accordingly, there are 112.5 epochs in each 24-hour day as shown in FIGS. 3 and 4. Each epoch is divided into successive time slots each 7.8125 milliseconds wide, thereby defining 98,304 time slots per epoch. The time slots are also distributed among three sets labeled A, B, and C with each set containing 32,768 time slots. Time slots in each set are identified by number from 0 to 32,767, and each slot is identified by its associated set and slot number, e.g., A-0 in FIG. 3. The time slots in each set are also interleaved in time in each epoch, so time slot "n" of set A follows time slot "n−1" of Set C, and precedes time slot "n" of set B, where "n" is the set of integers in the sequence 0 to 32,767.

Before a mission, predetermined time slot assignments are loaded in a number of Link 16 terminals to be deployed. The time slot assignments repeat for each epoch, and instruct each terminal with respect to radio frequency hop sets, message coding, and a mode of operation for the terminal during each time slot, i.e., whether the terminal transmits, receives, or relays during a given slot. Information contained in the time slot assignments includes the identification of each slot, set values that define the first slot in the epoch, and the action recurrence rate, i.e., how often an action assigned to the terminal for a given time slot repeats until the end of the epoch. In addition to the slot identification and set values, the type of message, crypto key identification, and a net number are also provided in the time slot assignments.

Link 16 uses three values from the time slot assignments as seeds to determine parameters for the CDMA and FDMA waveform signaling features. One seed is the identity of each time slot, a second is the code key, and the third is the net number. Since one of the seeds is the identity of each time slot, and the signal frequency and pseudo-noise code to be used by each terminal change for each slot, it will be understood why all terminals participating in a Link 16 network must use a common network time reference in order to communicate intelligible messages during their assigned slots.

Initial Entry Process

As mentioned earlier, an outside terminal desiring to enter an active Link 16 network must detect an IEM correctly before the terminal can enter the network and proceed to synchronize its current time with the network time. The IEM is transmitted from a terminal called the network time reference (NTR) which can be considered a "master clock" for the entire network. In addition, other terminals known as "users" can be initialized to transmit IEMs but at a lower rate than the NTR, so that terminals outside line of sight of the NTR may still be able to detect an IEM and enter the network.

The NTR terminal transmits an IEM at a rate of once every 12 seconds (a "frame" in Link 16) starting with the first time slot after midnight. If initialized to do so, a user terminal transmits IEMs at a lower rate of once every 24 seconds, also starting with the first time slot after midnight. The IEMs are transmitted over a default net number that is provided to each terminal as part of a mission plan. As mentioned, for most networks the default net number is zero (0).

Before an outside terminal can start the initial entry process, the terminal must have an estimate of the network time, and a maximum possible error of the estimate from network time. A minimum error used in Link 16 is 12 seconds (i.e., the rate at which the IEMs are transmitted), and the maximum error can be over one minute.

In response to a network entry command, the terminal uses the current time at the terminal as its initial time estimate. The current time is calculated by an internal chronometer that increments forward from a time that was initially entered in the terminal. The terminal adds the error estimate (e.g., 12 seconds) to the current time to obtain a time error window, and then calculates when the first IEM should occur after the end of the error window. The terminal then sets receiver 18 (FIG. 2) to match the frequency and code assigned to the time slot during which the IEM should be received. The receiver 18 listens for the IEM and dwells for twice a certain time base error that was initialized at the terminal before the network entry command. If no IEM is detected, the terminal resets the receiver 18 to match the frequency and code assigned to the time slot in which the next IEM should be received. Depending on the error in the terminal's current time, and the link margin to the NTR or user transmitting an IEM, the initial entry process alone can take up to several minutes to complete. Once an IEM is detected, the terminal uses the time slot in which the message was received to reset the terminal's current time reference, and continues to increment the reset time forward.

FIG. 5 illustrates the initial entry process for an outside Link 16 terminal whose current time is approximately 30 seconds behind the network time, and when the terminal is initialized with a time base error of one minute. The terminal receives an IEM on a first attempt in approximately 30 seconds from a network entry command at the terminal.

FIG. 6 shows the initial entry process if the same Link 16 terminal is unable to receive the IEM by the end of the error estimate, most likely due to interference or shadowing. The terminal recalculates when the next IEM should be received (based on the error) and repeats the process. If the terminal receives the next IEM, it does so approximately two minutes and 36 seconds after the network entry command. If not, the process continues until the terminal receives an IEM.

In FIG. 7, the current time at an outside Link 16 terminal is approximately 30 seconds ahead of network time, and the terminal is initialized with a time base error of one minute. The first IEM received by the terminal occurs approximately one minute and 36 seconds after the network entry command.

Concurrent Multi-Netting

Concurrent multi-netting (CMN-4) is a recent enhancement in Link 16 terminals. While prior Link 16 terminals can receive only one message packet during each time slot, a single CMN-4 terminal has a capability of receiving up to four different message packets per slot wherein each packet is associated with a different one of the stacked nets.

FIG. 8 shows a receiver system 100 in a CMN-4 Link 16 terminal. Like the system 10 in FIG. 2, the system 100 uses a single antenna 114 and a low noise amplifier (LNA) 112. By contrast, however, the receiver system 100 has four independent receive signal paths each comprised of a Link 16 receiver 118, a signal processor 120, and a cryptographic subsystem 122. The receiver 118 in each signal path is coupled to the output of the LNA 112.

Outputs from the cryptographic subsystem 122 in each signal path are combined and supplied as a single data stream to a Link 16 application processor 124. The application processor 124 is configured and programmed to process and output up to four different, decrypted messages to a host computer, and/or to process the data contained in the messages depending on the message types.

As noted earlier and shown in FIG. 1, Link 16 allows multiple or "stacked" nets to be created so that different message data can be exchanged among members of the corresponding nets during the same time slots without interference. Thus, a single CMN-4 terminal can be programmed and tuned to receive and detect messages associated with up to four different nets during the same time slots.

Notwithstanding the above, there remains a need for a system and process that will enable a Link 16 terminal to obtain initial entry in an active Link 16 network in significantly less time than presently required.

SUMMARY OF THE INVENTION

According to the invention, a process for allowing a terminal equipped for operation in a time division multiple access (TDMA) network to enter the network, wherein an initial entry message (IEM) is transmitted periodically in certain identified time slots by one or more members of the network, includes providing a time base at the terminal for indicating a current time, and providing a receiver system at the terminal including multiple receivers. An initial entry command is entered at the terminal at a given current time, and a number of time slots are identified in which the receivers at the terminal have an opportunity to detect an IEM after the given current time. Each of the receivers is set to detect an IEM during a different one of the identified time slots. When an IEM is first detected in a corresponding time slot, the current time at the terminal is reset based on the time slot in which the IEM was detected.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

The present invention enables Link 16 network terminals that have the capability for concurrent multi-net operation, i.e., CMN-4 enhanced terminals, to detect an initial entry message (IEM) from an active Link 16 network and to enter the network in significantly less time than now required.

Figure 1:
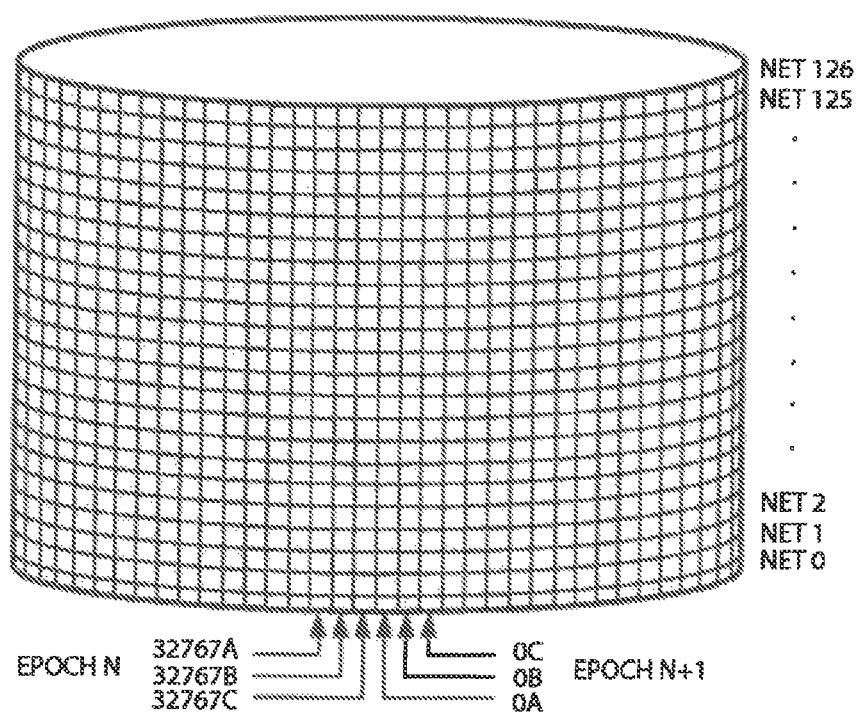
FIG. 1 is a representation of time slot structure in multiple stacked nets of a Link 16 tactical network.
Figure 2:
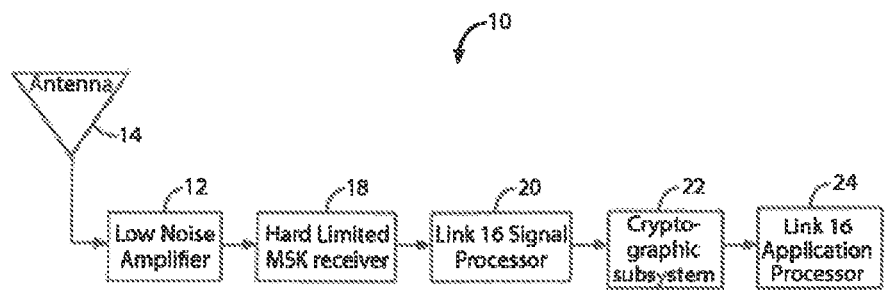
FIG. 2 is a schematic block diagram of a receiver system in prior Link 16 network terminals.
Figure 3:
FIG. 3 is a detailed representation of time slot structure in a Link 16 network.
Figure 3:
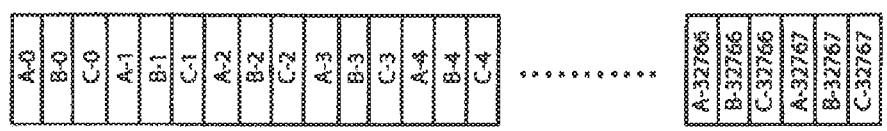
Figure 4:
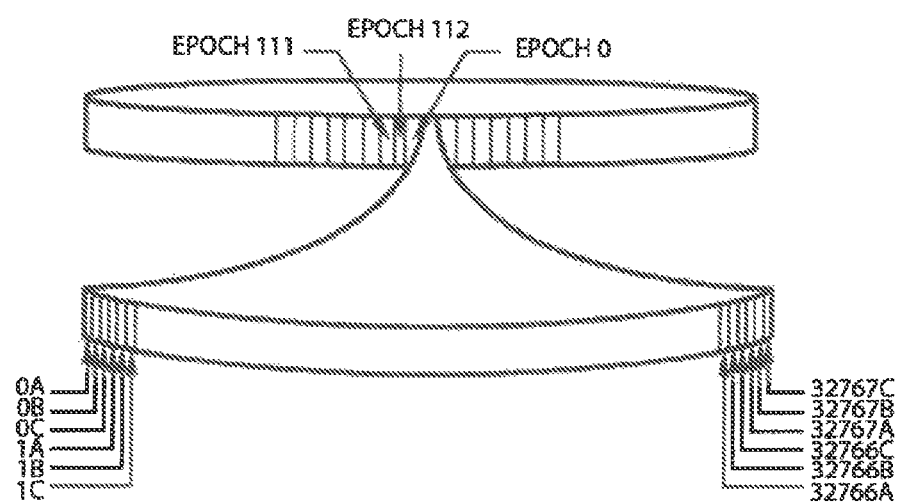
FIG. 4 is another detailed representation of the time slot structure in a Link 16 network, showing identification of time slots by set and number.
Figure 5:
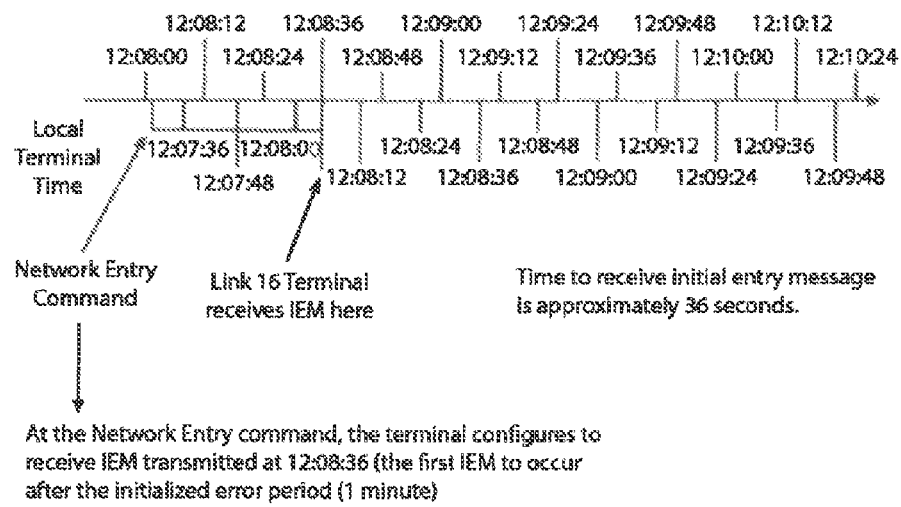
FIGS. 5 to 7 are diagrams showing timing for an outside terminal having the receiver system of FIG. 2, to detect an initial entry message (IEM) and enter an active Link 16 network.
Figure 6:
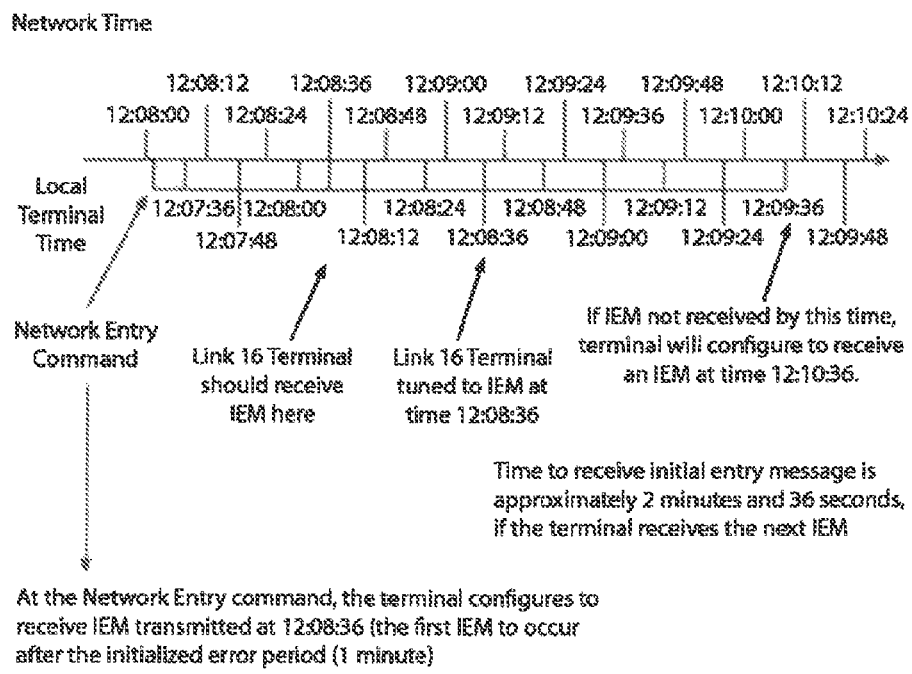
Figure 7:
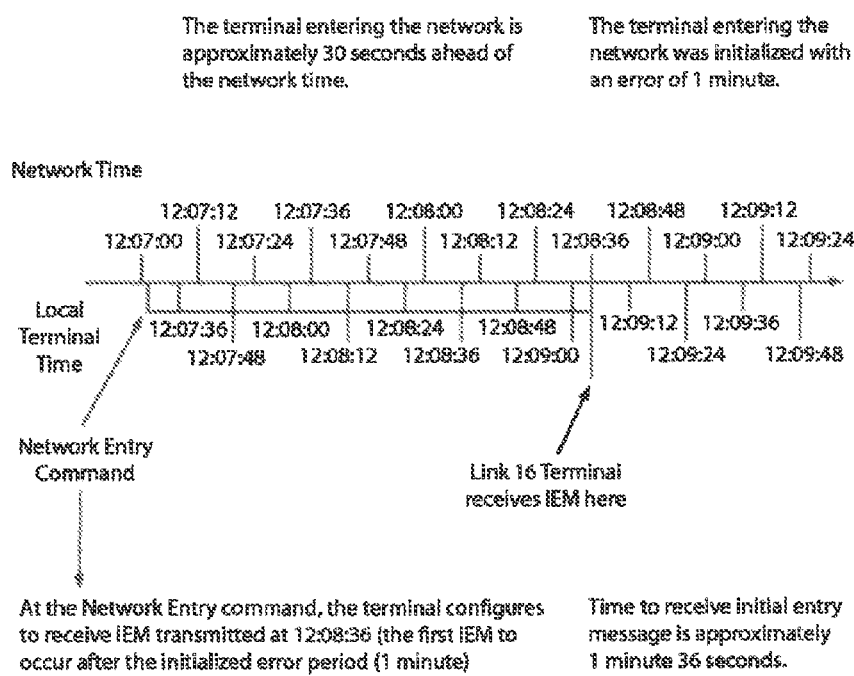
Figure 8:
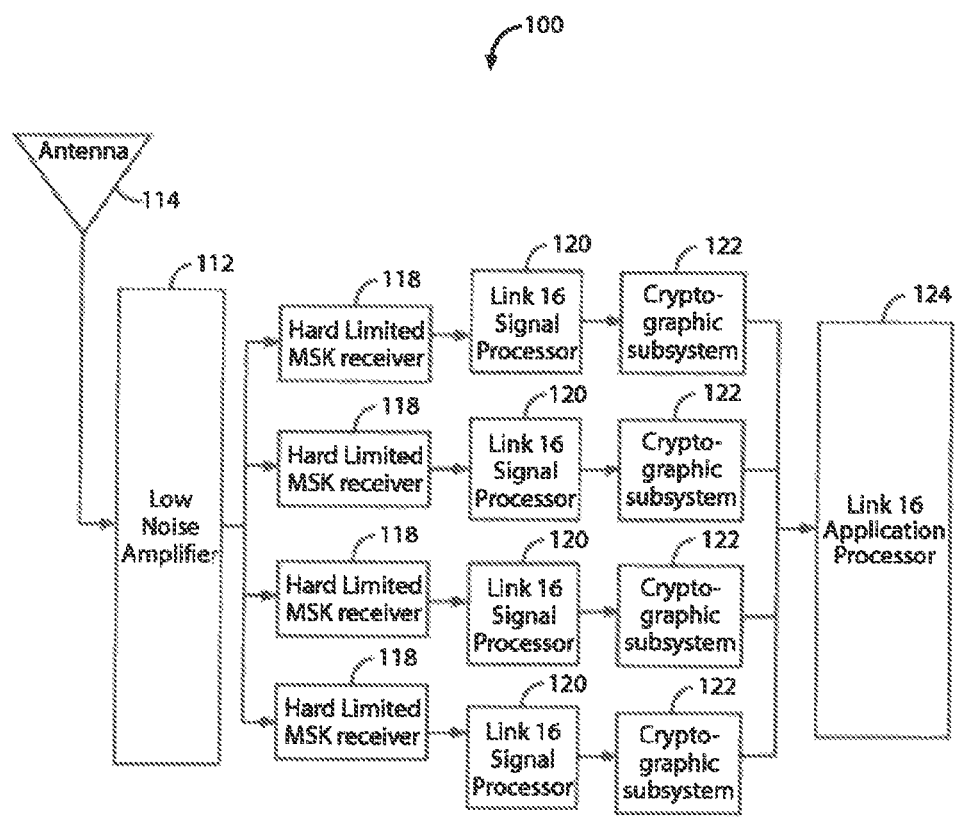
FIG. 8 is a schematic block diagram of a receiver system in an enhanced Link 16 network terminal.
Figure 9:
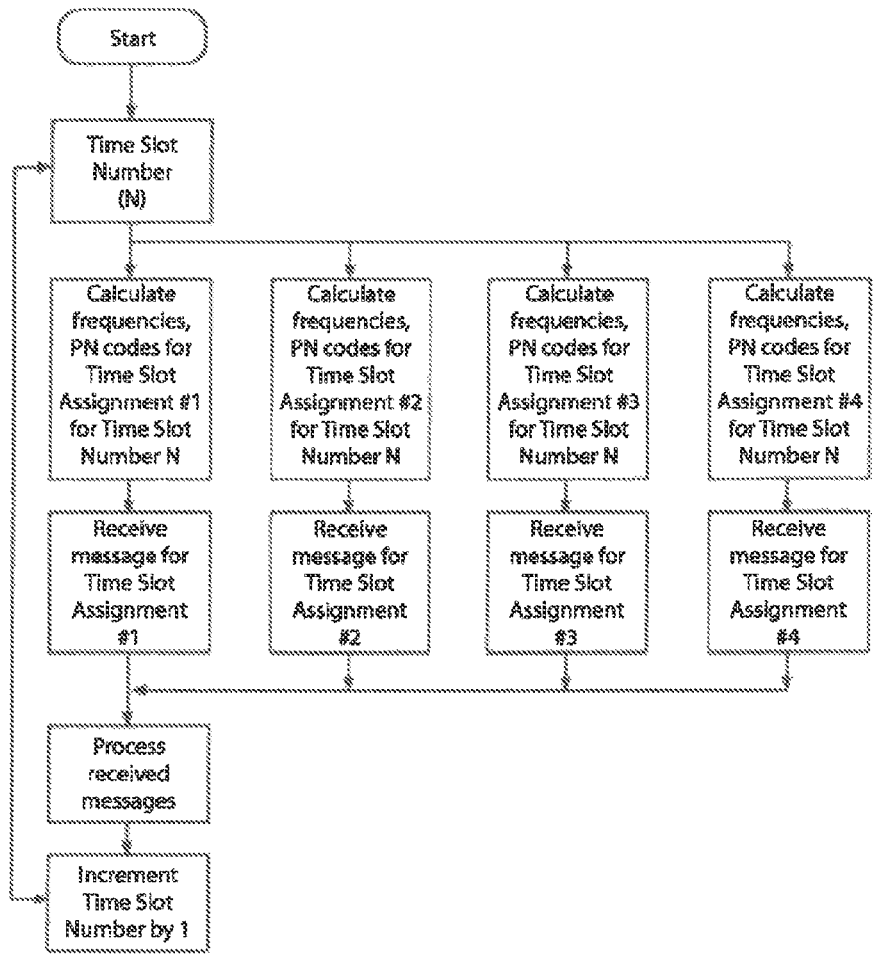
FIG. 9 is a flow diagram of steps taken during operation of the receiver system of FIG. 8.

During normal operation of a CMN-4 terminal and as shown in the flow diagram of FIG. 9, each of the four receivers 118 in the receive system 100 (FIG. 8) of the terminal is adjusted to receive message data associated with a corresponding net during a given time slot number N, by setting each receiver to listen on the frequency and to use a PN code assigned to the associated net for a given time slot number N. Software for implementing the operation may reside, for example, in the Link 16 application processor 124 of the terminal. Known as Link 16 Waveform Protocol Resource software, the software configures the processor 124 to calculate the required settings for each of the receivers 118 as shown in FIG. 9. The application processor 124 then outputs the calculated settings to each of the Link 16 signal processors 120 associated with the four receivers 118 in FIG. 8.

Figure 10A:
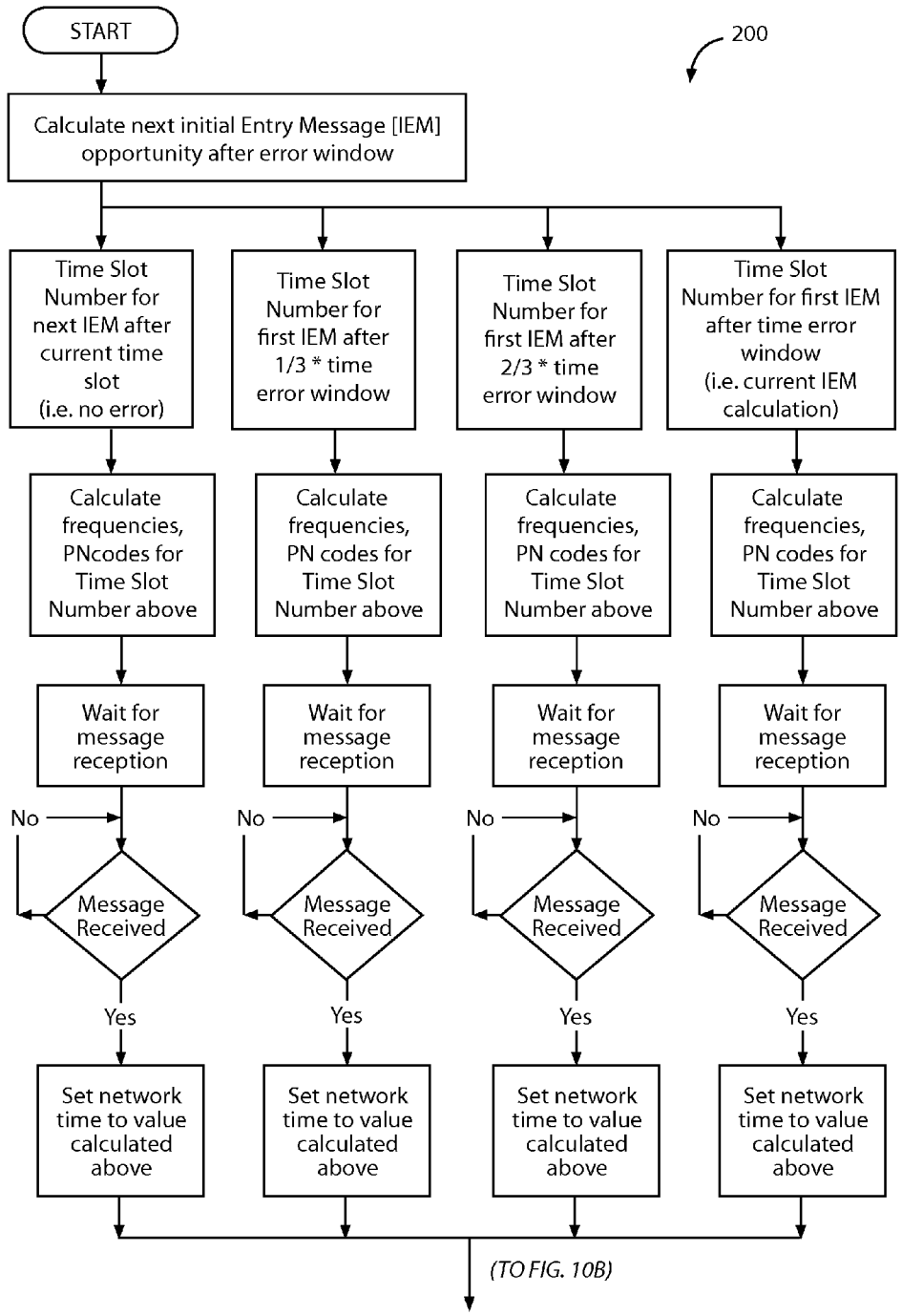
FIGS. 10A and 10B are flow diagrams of steps taken during operation of the receiver system of FIG. 8 when modified according to the invention.
Figure 10B:
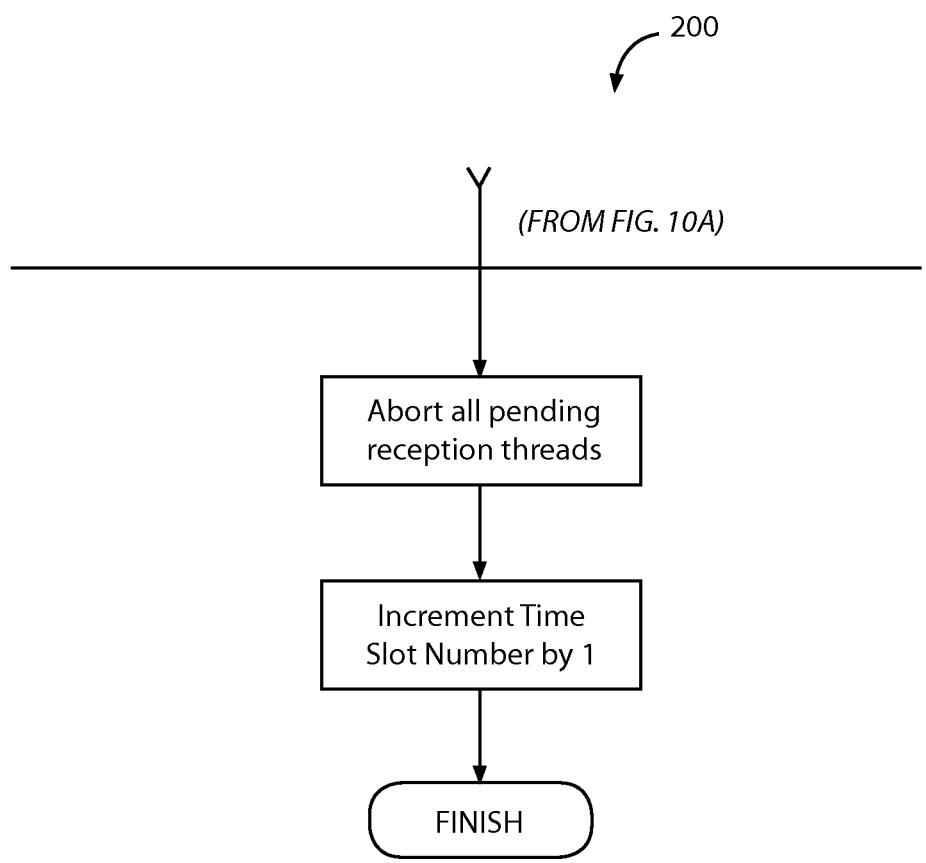

FIGS. 10A and 10B are flow diagrams illustrating steps of an entry process 200 according to the invention. The process 200 can performed, for example, by modifying existing software and/or containing additional software in the application processor 124 in FIG. 8. The entry process 200 can allow a CMN-4 equipped Link 16 terminal to obtain net entry in significantly less time than ordinarily required.

In response to a network entry command at the terminal and as shown in FIG. 10A, the application processor 124 calculates when the next opportunity to receive an IEM will occur based on the current time at the terminal. Each of the four receivers 118 in the terminal is then set to detect an IEM that is transmitted in a different one of four time slot numbers after the current time, and on the same net number (e.g., default net) on which the IEMs are periodically transmitted. That is, instead of assigning a different net number to each of the four receivers 118 to perform concurrent multi-netting as in FIG. 9, the receivers 118 are set to detect an IEM at four different times and on the same net number in response to a network entry command.

In the illustrated embodiment, a first one of the four time slots is calculated without adding a time error window to the current time at the terminal. A fourth or last one of the slots is calculated after adding the total time error window to the current time as is done by the current terminals. Second and third slots are calculated after adding, for example, one-third and two-thirds of the time error to the current time at the terminal, respectively. That is, the second and the third time slots are each calculated after adding only a fraction of the total time error window to the current time at the terminal. Persons skilled in the art will appreciate that fractions other than one-third and two-thirds of the time error window may be used when calculating the time slot numbers of the next IEMs expected to be received at the terminal.

Accordingly, by using the entry process 200, the terminal is set to detect an IEM at four different times only the last of which occurs after the entire time error window is added to the current time at the terminal. The terminal therefore does not miss an opportunity to detect an IEM in earlier time slots if the true error in the current time at the terminal is less than the error window.

Figure 11:
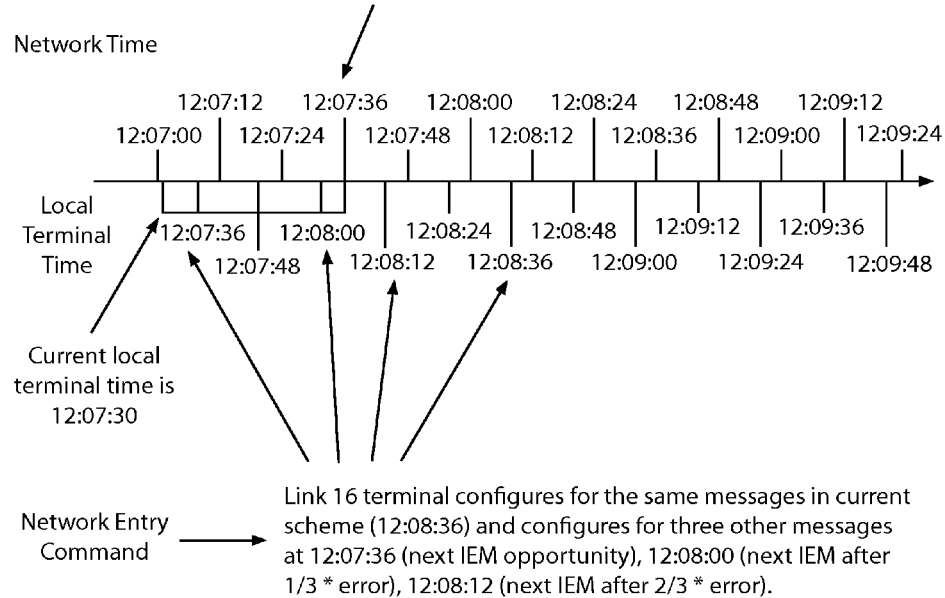
FIGS. 11 and 12 are diagrams showing timing for an outside terminal to detect an IEM and enter an active Link 16 network, according to the invention.
Figure 12:
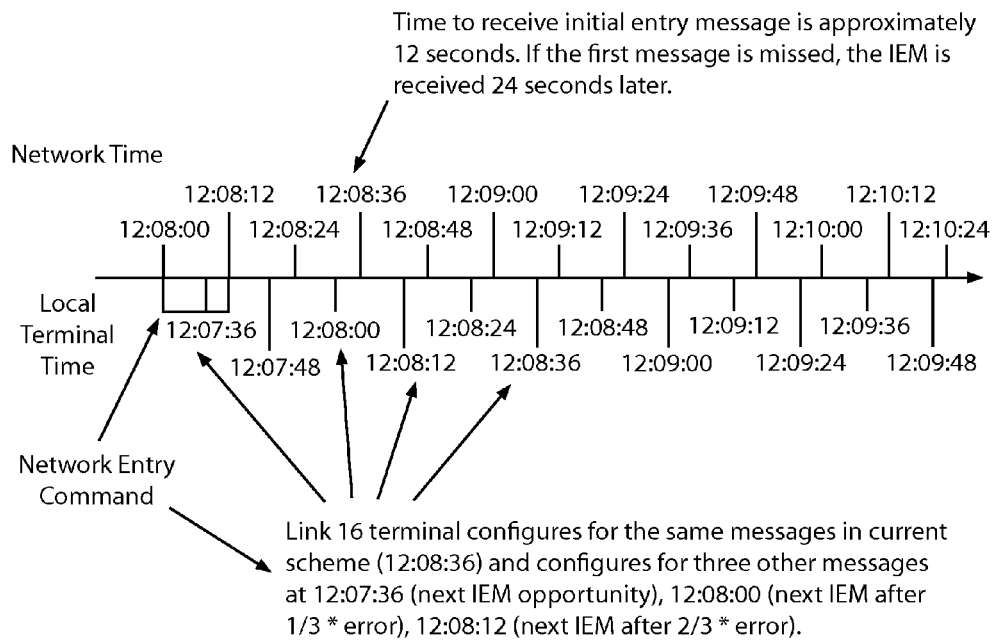

As shown in Table 1 and the timing diagrams of FIGS. 11 and 12, the time for a CMN-4 Link 16 terminal to receive an IEM by use of the inventive entry process 200, is substantially less than that needed by a conventional terminal under any of the listed entry conditions.

TABLE 1

Initial Entry Timing

| Initial Entry Condition | First set time to receive IEM with conventional terminal (seconds) | First set time to receive IEM with modified CMN-4 terminal (seconds) |
|---|---|---|
| Terminal behind network by 30 seconds (initialization time error 1 minute) | 36 | 24 |
| Terminal ahead network by 30 seconds (initialization time error 1 minute) | 96 | 30 |
| Terminal behind network by 30 seconds (initialization time error 1 minute) and fails to receive first IEM | 156 | 36 |
| Terminal ahead network by 30 seconds (initialization time error 1 minute) and fails to receive first IEM | 216 | 54 |

FIG. 11 shows the timing for an outside CMN-4 Link 16 terminal from a network entry command to the reception of an IEM when the application processor 124 in the terminal is programmed to carry out the inventive entry process 200. In FIG. 11, the current time at the terminal is approximately 30 seconds ahead of network time, and the terminal is initialized with a time error of one minute. The terminal receiver system 100 operates to configure each of the four receivers 118 to detect an IEM at four different times, all on the same (e.g., default) net number. The latest time is calculated per the current scheme (the first expected IEM time after the time base error entered at the terminal by the user), the earliest time is determined assuming a time error of zero in the current time at the terminal. The second and the third times can be the first IEM detection opportunities that occur after, for example, one-third and two-thirds the error entered by the user. Under the timing conditions in FIG. 11, the terminal detects an IEM in about only 30 seconds, i.e., the earliest set listening time. If for some reason the first IEM is missed, another IEM can be detected only 24 seconds later. See Table 1, second row, and FIG. 11.

In FIG. 12, the current time at an outside CMN-4 terminal is approximately 30 seconds behind network time, and the terminal is initialized with a time error of one minute. As in the case of FIG. 11, the terminal receiver system 100 configures each of the receivers 118 to detect an IEM at a different one of four different times, all on the same (e.g., default) net number. The latest time is calculated per the current scheme (the first expected IEM after the time base error entered at the terminal by the user), the earliest time is determined assuming an initialized time error of zero for the terminal's current time, and the second and the third times can be the first IEM detection opportunities that occur after, for example, one-third and two-thirds the error entered by the user.

Under the timing conditions in FIG. 12, the terminal detects an IEM in about only 24 seconds, i.e., the earliest calculated listening time. If for some reason the first IEM is missed, another IEM can be detected only 12 seconds later. See Table 1, first row.

As disclosed herein, the present invention uses to advantage the ability of a CMN-4 Link 16 terminal to receive multiple messages simultaneously, but in a way that enables the terminal to detect an IEM at four different times after a network entry command. The invention substantially reduces the time needed for the terminal to complete the initial entry process and proceed to synchronize with an active Link 16 network.

While certain embodiments of the present invention are described and illustrated herein, it will be understood by persons skilled in the art that various modifications, additions, and changes can be made without departing from the spirit and scope of the invention. Accordingly, the invention encompasses all such modifications, additions, and changes that lie within the bounds of the following claims.

The invention claimed is:

1. A process for allowing a terminal equipped for operation in a time division multiple access (TDMA) network to enter the network, wherein an initial entry message (IEM) is transmitted periodically in certain identified time slots by one or more members of the network for reception by the terminal, comprising:

providing a time base at the terminal for indicating a terminal current time:

providing a receiver system at the terminal including multiple receivers;

entering an initial entry command at the terminal at the terminal current time;

identifying a number of time slots in which the receivers at the terminal have an opportunity to detect an IEM after the terminal current time;

adding a determined time error window to the terminal current time, a first one of the identified time slots is the first slot in which one of the receivers has the opportunity to detect the IEM after the initial entry command is entered, a second one, of the identified time slots is the second slot in which one of the receivers has the opportunity to detect the IEM after the time error window is added to the terminal current time, and identifying one or more additional time slots in which one of the receivers has the opportunity to detect the IEM after the time error window is added to the terminal current time, identifying at least a third time slot in which one of the receivers has the opportunity to detect the IEM between the first and the second time slots;

setting each of the receivers to detect the IEM during a different one of the identified time slots;

detecting the IEM in each of the identified time slots; and resetting the terminal current time at the terminal based on the time slot in which the IEM is first detected.

2. A process according to claim 1, wherein the setting step includes setting each receiver according to an assigned frequency and code for the time slot during which the receiver is set to detect the IEM.

3. A process according to claim 1, including identifying a fourth time slot in which one of the receivers has an opportunity to detect the IEM between the first and the second time slots, and the third and the fourth time slots occur approximately at one-third and two-thirds the time error window, respectively.

4. A process according to claim 1, including providing the terminal in the form of a Concurrent Multi-Netting (CMN-4) enhanced Link 16 tactical network terminal.

5. A process according to claim 4, including performing at least some of the steps by configuring and programming an application processor provided in the terminal.

* * * * *